(12) United States Patent
Lee et al.

(10) Patent No.: US 12,200,489 B2
(45) Date of Patent: Jan. 14, 2025

(54) METHOD AND APPARATUS FOR AUTHENTICATING AND AUTHORIZING NETWORK FUNCTION IN MOBILE COMMUNICATION SYSTEM

(71) Applicant: SAMSUNG ELECTRONICS CO., LTD., Suwon-si (KR)

(72) Inventors: Duckey Lee, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 17/814,197

(22) Filed: Jul. 21, 2022

(65) Prior Publication Data

US 2023/0027515 A1    Jan. 26, 2023

(30) Foreign Application Priority Data

Jul. 22, 2021    (KR) ................. 10-2021-0096706

(51) Int. Cl.
*H04W 12/06*    (2021.01)
*H04W 8/00*    (2009.01)
*H04W 12/08*    (2021.01)

(52) U.S. Cl.
CPC ......... *H04W 12/068* (2021.01); *H04W 8/005* (2013.01); *H04W 12/08* (2013.01)

(58) Field of Classification Search
CPC ... H04W 12/068; H04W 8/005; H04W 12/08; H04W 12/069; H04W 8/00; H04L 63/0823; H04L 63/0281; H04L 63/083; H04L 67/51
See application file for complete search history.

(56) References Cited

U.S. PATENT DOCUMENTS

2022/0294775 A1* 9/2022 Singh .................. H04L 63/0884

OTHER PUBLICATIONS

"3rd Generation Partnership Project; Technical Specification Group Services and System Aspects; Security architecture and procedures for 5G system (Release 17)", 3GPP TS 33.501 V17.2.1 (Jun. 2021), 257 pages.
Huawei et al., "Correction to Authorization for indirect communication with delegated discovery procedure", Change Request, 3GPP TSG-SA3 Meeting #103-e, May 17-28, 2021, S3-211626, 4 pages.

(Continued)

*Primary Examiner* — El Hadji M Sall

(57) ABSTRACT

The disclosure relates to a 5G or 6G communication system for supporting a higher data transmission rate. Provided is a method by which a network function (NF) service consumer entity operates in a wireless communication system. The method by which the NF service consumer entity operates includes transmitting, to a service communication proxy (SCP) entity, a service request message including at least one of a client credentials assertion (CCA) credential of the NF service consumer entity, or information related to an NF service producer entity, receiving, from the SCP entity, a service response message, wherein the service response message generated by the NF service producer entity is forwarded by the SCP entity to the NF service consumer entity, and authenticating the NF service producer entity based on the service response message.

20 Claims, 8 Drawing Sheets

(56) References Cited

OTHER PUBLICATIONS

Huawei, "Match check between Token and CCA", Change Request, 3GPP TSG-CT WG4 Meeting #103-e, Apr. 14-23, 2021, C4-212276, 6 pages.
Nokia et al., "Service request authenticity verification in indirect communication", 3GPP TSG-SA3 Meeting #102Bis-e, Mar. 1-5, 2021, S3-211159, 2 pages.
Nokia et al., "Service response verification in indirect communication", 3GPP TSG-SA3 Meeting #102Bis-e, Mar. 1-5, 2021, S3-211161, 2 pages.
International Search Report and Written Opinion of the International Searching Authority dated Oct. 21, 2022 in connection with International Patent Application No. PCT/KR2022/010680, 9 pages.

\* cited by examiner

METHOD AND APPARATUS FOR AUTHENTICATING AND AUTHORIZING NETWORK FUNCTION IN MOBILE COMMUNICATION SYSTEM

CROSS-REFERENCE TO RELATED APPLICATION

This application is based on and claims priority under 35 U.S.C. § 119 to Korean Patent Application No. 10-2021-0096706, filed on Jul. 22, 2021, in the Korean Intellectual Property Office, the disclosure of which is incorporated by reference herein in its entirety.

BACKGROUND

1. Field

The disclosure relates to a method and apparatus for authentication between network devices in a mobile communication system, and more particularly, to a method and apparatus for managing authentication and authorization between network devices connected and communicating through a service communication proxy or a repeater.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

According to the aforementioned features and with the development of mobile communication systems, when network devices are connected and communicating with each other through a service communication proxy or a repeater, a method of managing authentication and authorization between the communicating network devices is required.

SUMMARY

Provided is a method of managing authentication and authorization between network devices (or network functions) connected and communicating through a service communication proxy in a mobile communication system for management of network access and data reception of a user equipment in the mobile communication system.

Additional aspects will be set forth in part in the description which follows and, in part, will be apparent from the description, or may be learned by practice of the presented embodiments of the disclosure.

According to an embodiment of the disclosure, a method by which a network function (NF) consumer operates in a wireless communication system may be provided. The method by which the NF consumer operates may include transmitting, to a service communication proxy (SCP), a service request message including at least one of a client credentials assertion (CCA) credential of the NF consumer, required characteristic information for an NF producer, or network slice information, receiving, from the SCP, a service response message including a CCA credential of the NF producer based on the service request message, and authenticating the NF producer having transmitted the service response message, based on the service response message.

According to an embodiment of the disclosure, a method by which an NF producer operates in a wireless communication system may be provided. The method by which the NF producer operates may include receiving, from an SCP, a service request message including an access token and a CCA of an NF consumer, authenticating the NF consumer based on the service request message, generating a service response message including a CCA of the NF producer after the NF consumer is authenticated, and transmitting, to the SCP, a service response message including the CCA of the NF producer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
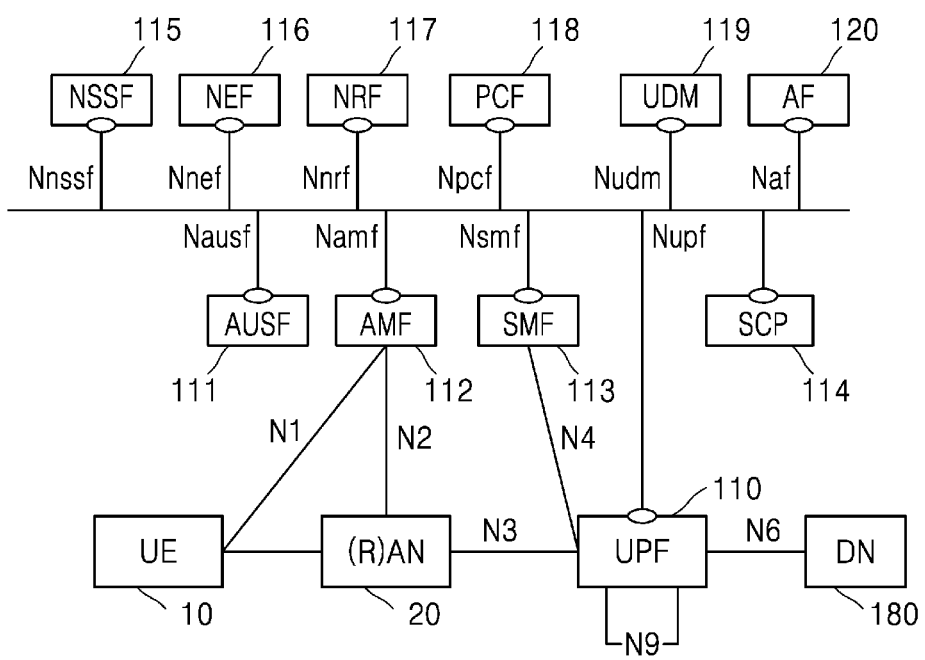
FIG. 1 illustrates a structure of a fifth generation (5G) mobile communication system, according to an embodiment of the disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the disclosure will now be described in detail with reference to accompanying drawings. Throughout the drawings, like reference numerals refer to like elements. The drawings are provided to help understanding of the disclosure, and it should be noted that the disclosure is not limited to the forms or arrangement illustrated in the drawings. Detailed descriptions of functions and features known to the public, which might obscure the gist of the disclosure, will be omitted. It should also be noted that only parts required to understand operations according to various embodiments of the disclosure will be described while the other parts will not be described to prevent obscuring the gist of the disclosure.

Embodiments of the disclosure are provided in the specification and drawings to easily describe and help understand the disclosure without being limited thereto. Accordingly, the disclosure should be construed to include not only the embodiments of the disclosure but also various modifications derived from the technical scope of the disclosure.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

It will be understood that each blocks and combination of the blocks of a flowchart may be performed by computer program instructions.

Furthermore, each block may represent a part of a module, segment, or code including one or more executable instructions to perform particular logic function(s). It is noted that the functions described in the blocks may occur out of order in some alternative embodiments. For example, two blocks shown in succession may in fact be executed substantially concurrently or the blocks may sometimes be executed in the reverse order, depending upon the functionality involved.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments of the disclosure, the module may include one or more processors.

Herein, the terms to identify access nodes, the terms to refer to network entities, the terms to refer to messages, the terms to refer to interfaces among network entities, the terms to refer to various types of identification information, etc., are examples for convenience of explanations. Accordingly, the disclosure is not limited to the terms as herein used, and may use different terms to refer to the items having the same meaning in a technological sense.

For convenience of explanations, the terms and names defined by the 3rd generation partnership project long term evolution (3GPP LTE) standard or their derivatives will be used hereinafter. The disclosure is not, however, limited to the terms and definitions, and may be equally applied to any systems that conform to other standards. In the disclosure, eNode B (eNB) may be interchangeably used with gNode B (gNB). For example, a base station referred to as an eNB may also indicate a gNB. The term 'terminal' or 'user equipment (UE)' may refer not only to a mobile station (MS), a cell phone, a narrowband Internet of things (NB-IoT) device, and a sensor but also to various wireless communication devices.

The disclosure will be described by taking an example of a network function (NF) instance, but is not limited thereto. For example, when an NF is not implemented as an instance but a server itself is implemented as an NF, a sever identity (ID) and address information (e.g., a fully qualified domain name (FQDN) or Internet protocol (IP) address, etc.) of the server may be provided as information of the NF. In other words, the NF instance may be replaced by an NF server, and an NF server and/or an NF instance may be an independent network entity. In the following description, an NF is assumed to be implemented as an instance, for convenience of explanations.

FIG. 1 illustrates a structure of a fifth generation (5G) mobile communication system, according to an embodiment of the disclosure.

A unit of performing each function in a core network of the 5G mobile communication system may be defined as an NF. The NF may be implemented in a certain server or a network device. In the case that the NF is implemented in a certain server or a network device, two or more NFs may be installed in a single particular server (or network device). That the NF is installed may mean that the NF operates as a device that performs a network function. In the case that the NF is implemented in the server, two or more different NFs for performing the same function may be installed. The two or more different NFs may be NFs for controlling the same operation or may be different network functions.

In an embodiment of the disclosure, two or more identical NFs may be included in one server. For example, there may be two or more user plane functions (UPFs) 110 for providing user data to a UE 10 in one server. In another example, different NFs may be installed in one server. For example, the UPF 110 and a session management function (SMF) 113 may be installed in one server.

In another example, one NF may be implemented in two or more different servers (or network devices). For example, the one UPF 110 may be implemented by two or more servers.

As described above, NFs of a 5G core network as herein used may refer to one entity that performs a particular operation in the network. The NFs are not simple functions but may be implemented in a certain server or a network device.

Referring to FIG. 1, the UE 10 may be a terminal that is able to access at least a 5G network. The UE 10 may also use other radio access schemes to access various networks such as a fourth generation (4G) network and/or a wireless fidelity (Wi-Fi) network. Furthermore, the UE 10 may have various types. For example, the UE 10 may be implemented as a terminal that provides only Internet of things (IoT) functions, implemented in a type such as a smart phone or a tablet computer, or implemented as a wearable device such as a smart watch or a smart glasses. The disclosure is not limited to special types of the UE 10.

A radio access node (RAN) 20 may correspond to a network node for transmitting or receiving a signal or data in the air to or from the UE 10 in a 5G radio access scheme. The RAN 20 may be a general term of a new radio access network that supports evolved universal terrestrial radio access (E-UTRA), evolved version of a 4G radio access technology, and new radio (NR), e.g., gNB.

NFs that make up a 5G core network will now be described. The NFs shown in FIG. 1 may include a UPF 110, an authentication server function (AUSF) 111, an access and mobility management function (AMF) 112, a session management function (SMF) 113, a service communication proxy (SCP) 114, a network slice selection function (NSSF) 115, a network exposure function (NEF) 116, an NF repository function (NRF) 117, a policy and control function (PCF) 118, a unified data management (UDM) 119, and an application function (AF) 120.

The UPF 110 may forward a downlink protocol data unit (PDU) received from a data network (DN) 180 to the UE 10 via a (R)AN 20, and forward an uplink PDU received from the UE 10 to the DN 180 via the (R)AN 20. Specifically, the UPF 110 may support functions of quality of service (QoS) handling (e.g., packet filtering, gating, uplink/downlink rate enforcement), uplink traffic verification (service data flow (SDF) mapping between an SDF and a QoS flow), transport-level packet marking in uplink and downlink, downlink packet buffering, downlink data notification triggering, etc., for a user plane, an anchor point for intra/inter radio access technology (RAT) mobility, an external PDU session point of interconnection to a DN, a user plane part for packet routing and forwarding, packet inspection and policy rule enforcement, an uplink classifier for lawful intercept, traffic use reporting, traffic flow routing to a DN, and a branch point for supporting a multi-home PDU session.

The AUSF 111 may process and store data for authentication of the UE 10. The AUSF 111 may also perform authentication on the UE 10 in a third generation partnership project (3GPP) access network and a non-3GPP access network.

The AMF 112 may provide a function for access and mobility management of each UE, and each UE may be connected to one AMF 112. Specifically, the AMF 112 may support functions of signaling between correspondent nodes (CNs) for mobility between 3GPP access networks, termination of an RAN control plane (CP) interface (i.e., N2 interface), termination (N1) of non-access stratum (NAS) signaling, NAS signaling security (NAS ciphering) and integrity protection), AS security control, registration management (registration area management), connection management, idle mode UE reachability (including controlling and performing paging retransmission), mobility management control (subscription and policy), intra-system mobility and inter-system mobility, network slicing, SMF selection, lawful intercept (for an interface to an AMF event and LI system), routing of a message for session management (SM) between the UE and the SMF, transparent proxy for SM message routing, access authentication, access authorization including roaming authority check, short message service (SMS) message routing between a UE and an SMS function (SMSF), security anchor function (SAF), security context management (SCM), etc. Some or all of the function (s) of the AMF 112 may be supported in a single AMF instance that operates as one AMF. The AMF 112 may also include a security anchor function (SEAF) responsible for a function related to security of the UE 10.

The SMF 113 may provide a session management function, and when the UE 10 has multiple sessions, each session may be managed by a different SMF. Specifically, the SMF 113 may support functions of session management (e.g., session establishment, modification and release including tunnel management between UPF and AN nodes), UE IP address allocation and management (optionally including authentication), selection and control of a UP function, traffic steering configuration for routing traffic from a UPF to a suitable destination, termination of an interface to a policy control function, policy and QoS control plane enforcement, lawful intercept (for an interface to an SM event and LI system), termination of an SM part of an NAS message, downlink data notification, initiation of AN-specific SM information (transmitting to AN through AMF and N2), determination of a session and service continuity (SSC) mode of a session, roaming function, etc. As described above, some or all of the function(s) of the SMF 113 may be supported in a single SMF instance that operates as one SMF.

The SCP 114 may provide indirect communication for specific different NFs through the SCP 114. The SCP 114 may also provide authorization to an NF service consumer for accessing security communication e.g., an NF service producer application programming interface (API), and perform load distribution, monitoring, overload control, etc. In other words, the SCP 114 may provide an indirect communication path between two or more different specific NFs.

The NSSF 115 may select a serving network slice instance set that serves the UE 10, determine and map, when required, an allowed network slice selection assistance (NSSAI) for a subscribed single NSSAI (S-NSSAI), determine an AMF set to be used to serve the UE 10, or determine a list of candidate AMF(s) by querying the NRF 117 if possible, based on a configuration.

The NEF 116 may expose an NF capability and event to an external network. The NEF 116 may also store and search for information as organized data by using a standardized interface Nudr for a unified data repository (UDR).

The NRF 117 supports a service search function. The NRF 117 receives an NF search request from an NF instance or the SCP 114, and provides information of a found NF instance (search object) to the NF instance or the SCP 114. The NRF 117 also supports proxy call state control function (P-CSCF) discovery and maintains an NF profile of an available NF instance and supported service. Furthermore, the NRF 117 notifies the NF service consumer or the SCP 114 of an NF instance newly registered/updated/deregistered along with an NF service.

The PCF 118 may receive information about a packet flow from an application server and provide a function of determining a policy for e.g., mobility management, session management, etc. Specifically, the PCF 118 may support functions of supporting a unified policy framework for controlling a network operation, providing a policy rule for a control plane function (or control plane functions) (e.g., an AMF, an SMF, etc.) to enforce a policy rule, implementing a front end to access subscription information related to determine a policy in a user data repository (UDR), etc.

The UDM 119 may store user subscription data, policy data, etc. The UDM 119 may include two parts, i.e., an application front end (FE) (not shown) and a UDR (not shown).

The AF 120 may interact with a 3GPP core network to provide a service (e.g., support functions of affecting application in traffic routing, accessing network capability exposure and interacting with a policy framework for policy control). The AF 120 may operate to interact with a 3GPP core network to provide a service. For example, the AF 120 may perform an operation regarding traffic routing of an application, access to the NEF 116, and interaction with a policy framework for policy control.

The DN 180 may refer to, for example, an operator service, Internet access or third party service, etc. The DN 180 may transmit a downlink PDU to the UPF 110 or receive a PDU transmitted from the UE 10 through the UPF 110.

Through the 5G core network illustrated in FIG. 1 as described above, the UE 10 may receive a service such as 5G network access and data transmission or reception. Furthermore, the 5G core network may perform communication between the NFs to manage the UE 10. In this case, the NFs may serve as an NF consumer and an NF producer to communicate with each other. The NF producer is a server to which NF consumers may access to receive a service from the NF producer. The NF consumer accesses the NF producer to use a service provided by the NF producer. The NF producer and the NF consumer may use the service provided by the NF producer to perform an operation required for control or management related to the UE 10 or a network.

The NF producer may provide a service in response to a service request of the NF consumer. Furthermore, the NF producer may provide a notification service that provides data when a requirement is satisfied. In this case, the NF producer may provide the notification service based on information registered by the NF consumer when the NF consumer subscribes to the notification service.

In an embodiment of the disclosure, the NF consumer and the NF producer may communicate with each other directly or via the SCP 114.

For example, when the NF consumer and the NF producer communicate with each other directly, the NF consumer may perform a procedure with the NRF 117 for discovering an NF producer and select the NF producer.

In another example, when the NF consumer and the NF producer do not perform direct communication, the NF consumer may transmit a service request for the NF producer to the SCP 114 and the SCP 114 may forward the service request of the NF consumer to the NF producer as it is. Communications between NFs and communications between an NF and the NRF 117 may all be transmitted through the SCP 114. In this case, the NF producer may authenticate the NF consumer with a client credentials assertion (CCA) (interchangeably used herein with a CCA credential) provided in or with a service request message by the NF consumer because direct communication with the NF consumer is not performed. For example, the NF consumer may select an NF producer through data transmission and reception with the NRF 117 and transmit an address of the NF producer to the SCP 114. In another example, instead of the NF consumer, the SCP 114 may select the NF producer.

For example, in a case that the NF consumer and the NF producer are directly connected or perform direct communication, mutual authentication between the NF consumer and the NF producer may be possible. For example, when the NF consumer accesses a web server of the NF producer, the NF producer may transmit a credential of the NF producer to the NF consumer. The NF consumer may also identify a credential (e.g., a digital credential) of the NF producer in an authentication server, and determine and authenticate the NF producer as a correct server and then access the NF producer. Furthermore, in a case that the NF producer also tries to authenticate the NF consumer, the NF producer may identify and authenticate a credential of the NF consumer received in response to the credential of the NF producer, and thus authenticate the NF consumer. (That is, mutual authentication between the NF producer and the NF consumer is possible).

On the other hand, when the NF consumer and the NF producer according to an embodiment of the disclosure perform communication through the SCP 114, authentication between the NF consumer and the SCP 114 is possible and authentication between the NF producer and the SCP 114 is possible, but mutual authentication between the NF producer and the NF consumer may be hardly performed because of security concerns.

For example, in the case that the NF consumer and the NF producer perform communication through the SCP 114, the NF producer is able to authenticate the NF consumer. First, the NF consumer may transmit a message including a CCA credential of the NF consumer that allows authentication of the NF consumer to the SCP 114. For example, the NF consumer may generate the CCA credential of the NF consumer which allows authentication of the NF consumer. The NF consumer may then transmit the CCA credential of the NF consumer in a service request to the SCP 114. The SCP 114 may transmit a message (e.g., the service request) including the CCA credential of the NF consumer to the NF producer. The NF producer may use the CCA credential of the NF consumer to determine which NF consumer it is that the message comes from, and when identifying the CCA credential signed by the NF consumer, use a digital credential associated with the signed credential to authenticate whether the NF consumer is a correct NF consumer. Accordingly, the NF producer may authenticate an NF consumer in this method.

On the other hand, when the SCP 114, instead of the NF consumer, selects the NF producer, there is a limit for the NF consumer to authenticate the NF producer in the aforementioned method. For example, in the case that the SCP 114, instead of the NF consumer, selects the NF producer, the NF consumer performs transmission including information relating to the NF producer requested by the NF consumer to the SCP 114, and the SCP 114 may select the NF producer. Hence, as the NF consumer has not yet discovered the NF producer even when the NF producer transmits the credential of the NF producer to the NF consumer through the SCP 114, the NF consumer has limitations to authentication of the NF producer because the NF consumer has difficulty in determining whether the NF producer is a reliable or correct one intended by the NF consumer.

The disclosure may provide a method for handling issues in relation to authentication of NFs that may be caused in the aforementioned conditions. The disclosure may also provide a method by which the NF consumer may safely receive services from an authenticated correct NF producer in the case that the NF consumer and the NF producer communicate through the SCP 114. Accordingly, the disclosure provides a method for addressing the aforementioned limitations and security issues that may be caused between NFs, with reference to the drawings as will be described below.

Figure 2:
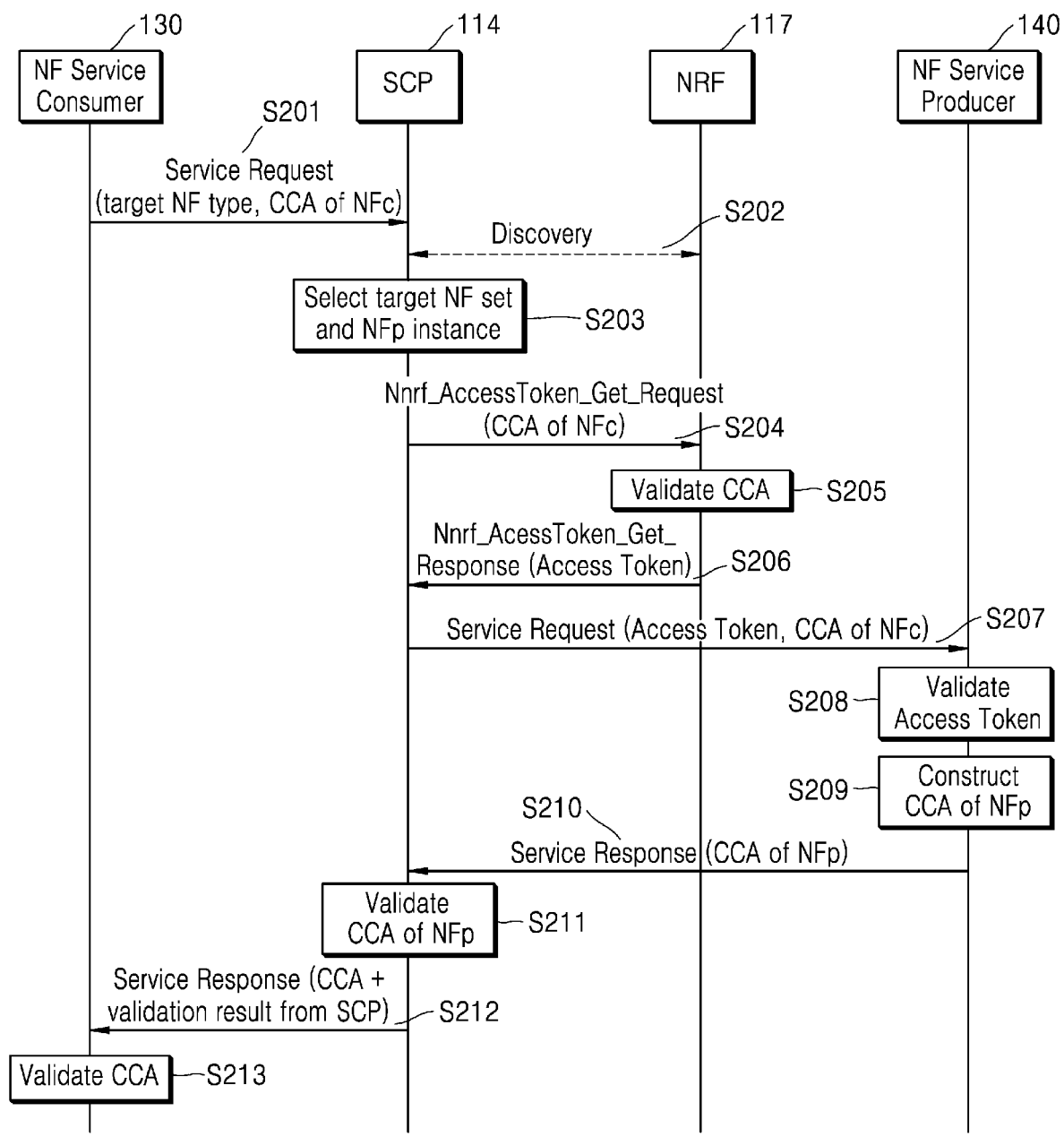
FIG. 2 illustrates an authentication and authorization procedure for service request and response of a REQUEST-RESPONSE model between network devices using a service communication proxy to confirm authentication of the network devices, according to an embodiment of the disclosure.

FIG. 2 illustrates an authentication and authorization procedure for service request and response of a REQUEST-RESPONSE model between network devices using a service communication proxy to confirm authentication of the network devices, according to an embodiment of the disclosure.

Before describing what is shown in FIG. 2, NFs used in the disclosure will now be examined. First, an NF consumer 130 is illustrated as an NFc and an NF producer 140 is illustrated as an NFp. Hence, in the following description, the NF consumer 130 and NFc may be interchangeably used and the NF producer 140 and the NFp may be interchangeably used. Furthermore, in the embodiment of the disclosure as shown in FIG. 2, assumed is a case of using components of the SCP 114 and the NRF 117 as described above in connection with FIG. 1.

FIG. 2 shows an embodiment of the disclosure in which the SCP 114 authenticates the NF producer 140 using information included in a CCA credential of the NF producer 140. In an embodiment of the disclosure, the SCP 114 that selects the NF producer 140 for the NF consumer 130 may authenticate the CCA of the NF producer 140 and indicate the result to the NF consumer 130.

In an embodiment of the disclosure, even in a case that the SCP 114 selects the NF producer 140 by transmitting and receiving data with the NRF 117 rather than the NF consumer 130 directly discovering the NF producer 140, the NF producer 140 may be authenticated without generating security issues. Furthermore, as the SCP 114 transmits information about a result of authenticating the NF producer 140 to the NF consumer 130, the NF consumer 130 may identify information about the authenticated NF producer 140 and safely receive services from the NF producer 140. Moreover, the disclosure may have an effect that the SCP 114 authenticates the NF producer 140 by using the CCA of the NF producer 140 generated by the NF producer 140. In addition, the disclosure solves security problems that may be caused between NFs, so that the NF consumer 130 is able to safely receive services from the authenticated NF producer 140.

In operation S201, the NF consumer 130 may transmit a service request to the SCP 114. In an embodiment of the disclosure, the NF consumer 130 may request a particular service for the UE 10 or a group of the UEs 10 and receive an associated response from the NF producer 140. In this case, the NF consumer 130 may not select the NF producer 140 to which the service request is to be transmitted. Instead, the NF consumer 130 may transmit, to the SCP 114, the service request including at least one of a required characteristic that may specify the NF producer 140 (as a non-limiting example, the required characteristic includes a network function type of the AMF 112, the SMF 113, the UDM 119, or the like), network slice information that may indicate a network slice from which the UE 10 or a group of the UEs 10 is able to receive services or a network slice to which the NF consumer 130 belongs, or a CCA that may allow authentication of the NF consumer 130.

In an embodiment of the disclosure, a CCA credential of the NF consumer 130 may include at least one of an NF instance ID of the NF consumer 130, time information that may indicate an expiration date of the credential, an NF type of an expected NF producer, information about the network slice to which the NF consumer 130 belongs, or the digital credential (or uniform resource locator (URL) information of the digital credential) of the NF consumer 130. A CCA of an NF may be signed with a signature key of the NF.

In operation S203, in response to receiving the service request from the NF consumer 130, the SCP 114 may select the NF producer 140 that suits the required characteristic designated by the NF consumer 130. To select the NF producer 140, the SCP 114 may transmit information including the required characteristic received from the NF consumer 130 to the NRF 117 in operation S202. The SCP 114 may also receive, from the NRF 117, information of the NFs that may correspond to the NF producer 140 suitable for the required characteristic. In operation S203, the SCP 114 may select the NF producer 140 based on the received information. To select the NF producer 140, the SCP 114 may select an NF set that satisfies the required characteristic, and select the NF producer 140 that belongs to the selected NF set.

In operation S204, the SCP 114 may transmit to the NRF 117 a request to issue an access token required to transmit the service request received from the NF consumer 130 to the selected NF producer 140. In this case, the access token request message may include all or some of pieces of the following information:

NF instance ID and NF type of the NF consumer 130 information about an NF service requiring access permission information including all or at least one of NF type or NF producer instance ID of the NF producer 140 requiring access permission The SCP 114 may transmit, to the NRF 117, the request to issue the access token including a CCA credential of the NF consumer 130 in addition to the aforementioned information.

In operation S205, in response to receiving the request to issue an access token from the SCP 114, the NRF 117 may check the CCA credential information of the NF consumer 130 and information about the NF producer 140 included in the request, to confirm whether the NF consumer 130 is an NF authorized to receive a service from the NF producer 140. When the NF consumer 130 is determined as an authorized NF, the NRF 117 may issue an access token that may be used in requesting a service from the NF producer 140 to the SCP 114, in operation S206.

In operation S207, after receiving the access token from the NRF 117, the SCP 114 may transmit the service request including the issued access token and the CCA credential of the NF consumer 130 to the NF producer 140.

In operation S208, in response to receiving the service request from the SCP 114, the NF producer 140 may verify the access token and the CCA credential of the NF consumer 130 received along with the service request, and determine whether the NF consumer 130 is a correct NF allowed to request a service from the NF producer 140 and whether the service request is allowed by the NRF 117.

After succeeding in authentication of the NF consumer 130 and verification of the access token, the NF producer 140 may construct a CCA credential of the NF producer 140, in operation S209.

After succeeding in authentication of the NF consumer 130 and verification of the access token, the NF producer 140 may transmit a service response to the SCP 114 in response to the service request, in operation S210. In this case, the service response may include information requested in the service request or response information for a service. Furthermore, the service response may include the CCA credential of the NF producer 140 with which to authenticate the NF producer 140.

In an embodiment of the disclosure, the CCA credential of the NF producer 140 may include an NF instance ID of the NF producer 140, an NF instance ID of the NF consumer 130, time information indicating an expiration date of the credential, and a digital credential of the NF producer 140 or URL information of the digital credential, etc. A CCA of an NF may be signed with a signature key of the NF.

In operation S211, the SCP 114 may determine whether the service response message received from the NF producer 140 has been transmitted from the NF producer 140 that received the service request and transmitted from the correct NF producer 140 by verifying the CCA credential of the NF producer 140 included in the service response message.

In operation S212, the SCP 114 may successfully identify the CCA credential attached to the service response received from the NF producer 140, and transmit, to the NF consumer 130, a service response including information indicating that the service response has been received from the correct NF producer 140 that received the service request.

In operation S213, in response to receiving the service response from the SCP 114, the NF consumer 130 may proceed e.g., a procedure for identifying an authentication result of the NF producer 140 in the SCP 114 included in the service response and the CCA credential of the NF producer 140, and when the procedure is successful, the NF consumer 130 may recognize that the service response is a correct response to the service request that the NF consumer 130 has transmitted and process the service response.

Figure 3:
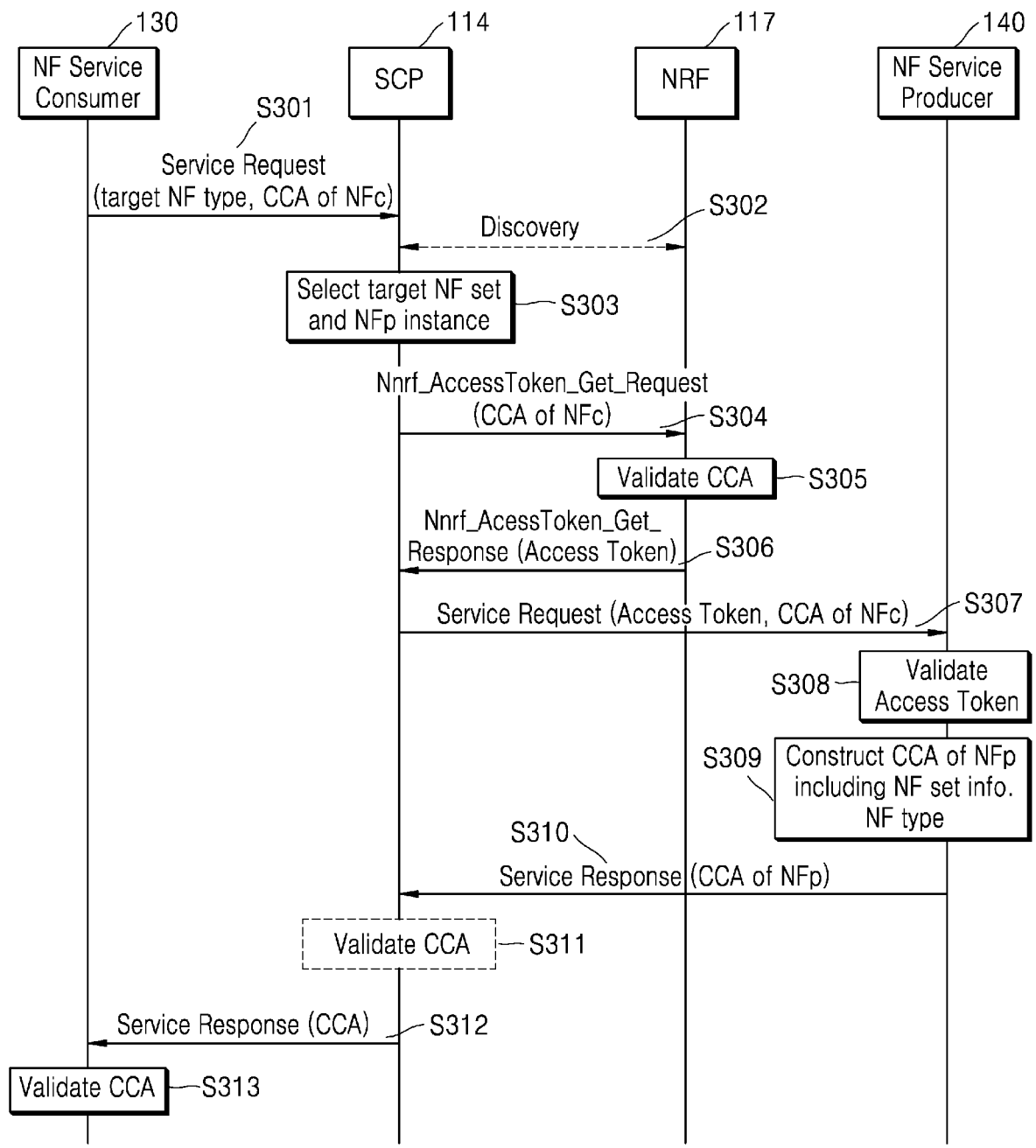
FIG. 3 illustrates an authentication and authorization procedure for service request and response of a REQUEST-RESPONSE model between network devices based on network device authentication information including network device type and set information when a service communication proxy acts as a proxy to select the network device, according to an embodiment of the disclosure.

FIG. 3 illustrates an authentication and authorization procedure for service request and response of a REQUEST-RESPONSE model between network devices based on CCA authentication information of the network device including, e.g., network device type and set information when a service communication proxy acts as a proxy to select the network device, according to an embodiment of the disclosure.

FIG. 3 shows an embodiment of the disclosure in which the NF consumer 130 authenticates the NF producer 140 using information included in a CCA credential of the NF producer 140. In an embodiment of the disclosure, the NF producer 140 may add information allowing the NF consumer 130 to verify or authenticate whether the NF producer 140 is a correct one expected or targeted by the NF consumer 130 to the CCA credential of the NF producer 140. The NF consumer 130 may use the information included in the CCA credential of the NF producer 140 to identify whether the NF producer 140 that has transmitted a service response is a correct one expected or targeted by the NF consumer 130 and authenticate the NF producer 140.

An embodiment of the disclosure may have an effect that the NF consumer 130 authenticates the NF producer 140, even in a case that the SCP 114 selects the NF producer 140 by transmitting and receiving data with the NRF 117 rather than the NF consumer 130 directly discovering the NF producer 140. Furthermore, the disclosure may have an effect that the NF consumer 130 authenticates the NF producer 140 based on the CCA of the NF producer 140, which is generated by the NF producer 140. In addition, the disclosure solves security problems that may be caused between NFs, so that the NF consumer 130 is able to safely receive services from the authenticated NF producer 140. In operation S301, the NF consumer 130 may transmit a service request to the SCP 114. In an embodiment of the disclosure, the NF consumer 130 may request a particular service from the UE 10 or a group of the UEs 10 and receive an associated response from the NF producer 140. In this case, the NF consumer 130 may not select the NF producer 140 to which the service request is to be transmitted. Instead, the NF consumer 130 may transmit, to the SCP 114, the service request including at least one of a required characteristic that may specify the NF producer 140 (as a non-limiting example, the required characteristic includes a network function type of the AMF 112, the SMF 113, the UDM 119, or the like), network slice information that may indicate a network slice from which the UE 10 or a group of the UEs 10 is able to receive services or a network slice to which the NF consumer 130 belongs, or a CCA credential that may allow authentication of the NF consumer 130.

In an embodiment of the disclosure, a CCA credential of the NF consumer 130 may include at least one of an NF instance ID of the NF consumer 130, time information that may indicate an expiration date of the credential, an NF type of an expected NF producer, information about the network slice to which the NF consumer 130 belongs, or a digital credential (or URL information of the digital credential) of the NF consumer 130. A CCA of an NF may be signed with a signature key of the NF.

In operation S303, in response to receiving the service request from the NF consumer 130, the SCP 114 may select the NF producer 140 that suits the required characteristic designated by the NF consumer 130. To select the NF producer 140, the SCP 114 may transmit information including the required characteristic received from the NF consumer 130 to the NRF 117 in operation S302. The SCP 114 may also receive, from the NRF 117, information of the NFs that may correspond to the NF producer 140 suitable for the required characteristic. In operation S303, the SCP 114 may select the NF producer 140 based on the received information. To select the NF producer 140, the SCP 114 may select an NF set that satisfies the required characteristic, and select the NF producer 140 that belongs to the selected NF set.

In operation S304, the SCP 114 may transmit to the NRF 117 a request to issue an access token required to transmit the service request received from the NF consumer 130 to the selected NF producer 140. In this case, the access token request message may include all or some of pieces of the following information:

NF instance ID and NF type of the NF consumer 130 information about an NF service requiring access permission information including all or at least one of NF type or NF producer instance ID of the NF producer 140 requiring access permission The SCP 114 may transmit, to the NRF 117, the request to issue the access token including a CCA credential of the NF consumer 130 in addition to the aforementioned information.

In operation S305, in response to receiving the request to issue an access token from the SCP 114, the NRF 117 may check the CCA credential information of the NF consumer 130 and information about the NF producer 140 included in the request to confirm whether the NF consumer 130 is an NF authorized to receive a service from the NF producer 140. When the NF consumer 130 is determined as an authorized NF, the NRF 117 may issue an access token that may be used in requesting a service from the NF producer 140 to the SCP 114, in operation S306.

In operation S307, after receiving the access token from the NRF 117, the SCP 114 may transmit the service request including the issued access token and the CCA credential of the NF consumer 130 to the NF producer 140.

In operation S308, in response to receiving the service request from the SCP 114, the NF producer 140 may check the access token and the CCA credential of the NF consumer 130 received along with the service request to determine whether the NF consumer 130 is a correct NF allowed to request a service from the NF producer 140 and whether the service request is allowed by the NRF 117.

After succeeding in authentication of the NF consumer 130 and verification of the access token, the NF producer 140 may construct a CCA credential of the NF producer 140, in operation S309.

After succeeding in authentication of the NF consumer 130 and verification of the access token, the NF producer 140 may transmit a service response to the SCP 114 in response to the service request, in operation S310. In this case, the service response may include information requested in the service request or response information for a service. Furthermore, the service response may include the CCA credential of the NF producer 140 with which to authenticate the NF producer 140.

In an embodiment of the disclosure, the CCA credential of the NF producer 140 may include at least one of an NF instance ID of the NF producer 140, information about an NF set to which the NF producer 140 belongs, information about an NF type to which the NF producer 140 belongs, information about a network slice to which the NF producer 140 belongs, an NF instance ID of the NF consumer 130, time information indicating an expiration date of the credential, or a digital credential of the NF producer 140 or URL information of the digital credential. A CCA of an NF may be signed with a signature key of the NF.

In operation S312, the SCP 114 may transmit a service response message received from the NF producer 140 to the NF consumer 130.

In another embodiment of the disclosure, in operation S311, the SCP 114 may successfully identify whether the service response message received from the NF producer 140 has been transmitted from the NF producer 140 that received the service request and transmitted from the correct NF producer 140 by verifying the CCA credential of the NF producer 140 included in the service response message. Furthermore, the SCP 114 may transmit the service response message to the NF consumer 130 when the procedures are successfully performed. The operation of the SCP 114 in operation S311 may be optionally performed.

In operation S313, the NF consumer 130 that has received the service response from the SCP 114 may check information included in the CCA credential of the NF producer 140 added to the service response. For example, the NF consumer 130 may determine whether the NF type of the NF producer 140 corresponds to the NF type of an expected NF producer included in the service request transmitted by the NF consumer 130 to authenticate whether the NF producer 140 is a correct NF. For example, the NF consumer 130 may identify the network slice information among the information included in the CCA credential of the NF producer 140 to determine whether the network slice information requested by the NF consumer 130 corresponds to information about the network slice that the NF producer 140 may serve. After the identification procedure for the CCA credential of the NF producer 140 is successfully performed, the NF consumer 130 may recognize that the service response is a correct response to the service request transmitted by the NF consumer 130 and process the service response.

Figure 4:
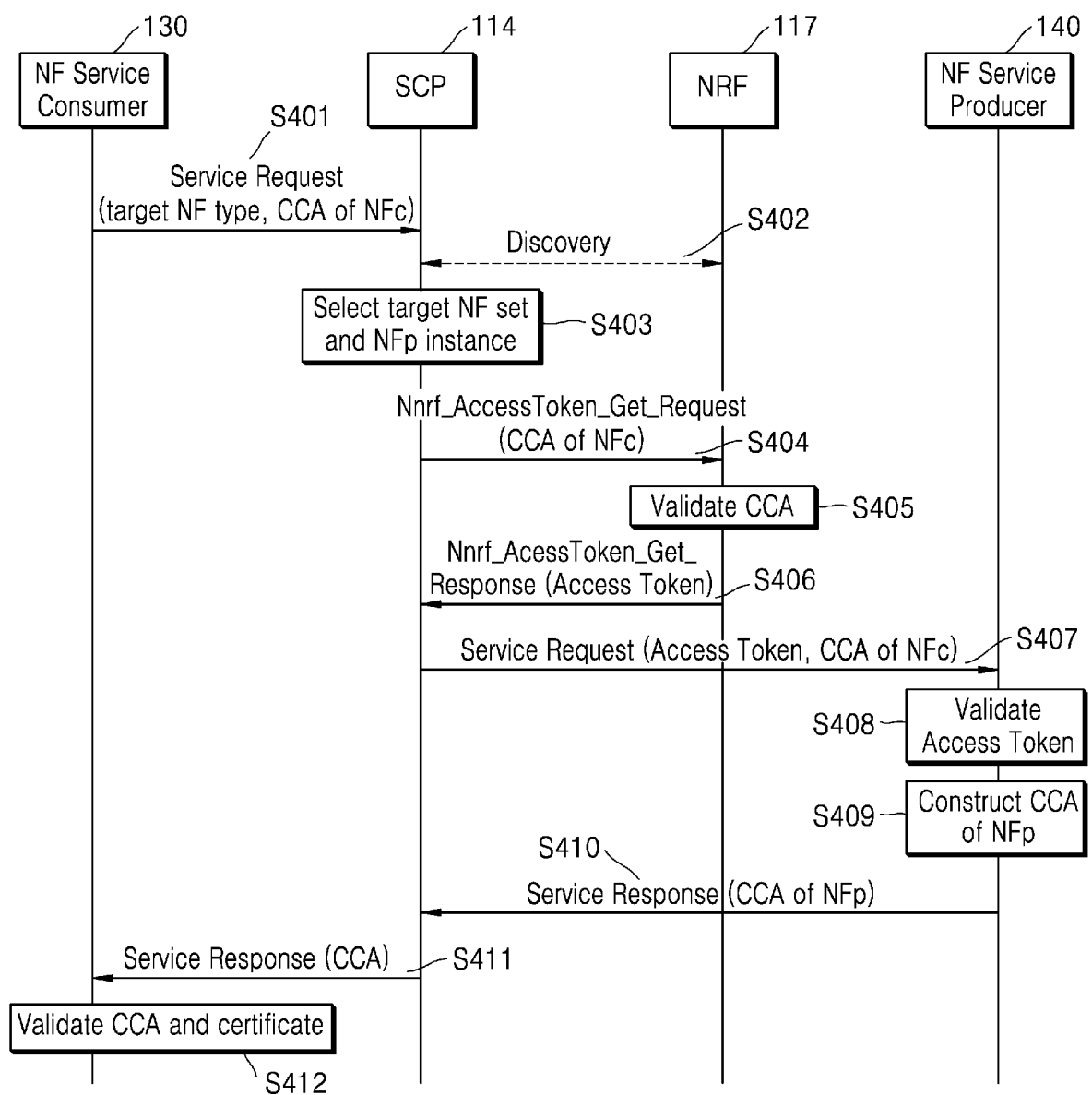
FIG. 4 illustrates an authentication and authorization procedure for service request and response of a REQUEST-RESPONSE model between network devices based on a digital credential including network device type and set information when a service communication proxy acts as a proxy to select the network device, according to an embodiment of the disclosure.

FIG. 4 illustrates an authentication and authorization procedure for service request and response of a REQUEST-RESPONSE model between network devices based on a digital credential including, e.g., network device type and set information when a service communication proxy acts as a proxy to select the network device, according to an embodiment of the disclosure.

FIG. 4 shows an embodiment of the disclosure in which the NF consumer 130 authenticates the NF producer 140 using information included in a digital credential of the NF producer 140 associated with a CCA credential of the NF producer 140. In an embodiment of the disclosure, the NF producer 140 may add information allowing the NF consumer 130 to verify or authenticate whether the NF producer 140 is a correct one expected or targeted by the NF consumer 130 to the digital credential of the NF producer 140 associated with the CCA credential of the NF producer 140. The NF consumer 130 may use the information included in the digital credential of the NF producer 140 associated with the CCA credential of the NF producer 140 to identify whether the NF producer 140 that has transmitted the service response is a correct one expected or targeted by the NF consumer 130 and authenticate the NF producer 140.

An embodiment of the disclosure may have an effect that the NF consumer 130 authenticates the NF producer 140, even in a case that the SCP 114 selects the NF producer 140 by transmitting and receiving data with the NRF 117 rather than the NF consumer 130 directly discovering the NF producer 140. Furthermore, as the NF consumer 130 is able to authenticate the NF producer 140 using a digital credential, which is an accredited certificate, the NF producer 140 may be authenticated with a highly reliable credential. In addition, the disclosure solves security problems that may be caused between NFs, so that the NF consumer 130 is able to safely receive services from the authenticated NF producer 140.

In an embodiment of the disclosure, a digital credential of an NF may include the following information:
- version: version information of the digital credential
- serial number: a unique number of the digital credential
- validity period: an expiration date of the digital credential
- signature: signature information according to a signature algorithm used for the digital credential
- subject public key info: public key information of an NF included in the digital credential
- extension: extension information of the digital credential the extension may include subjectAltName.

subjectAltName may include information that may indicate an NF.

In an embodiment of the disclosure, NFs may add information about an NF type of the NF, information about an NF set to which the NF belongs, etc., to a digital credential of the NF. The information about the NF may be included in subjectAltName, which is one of extensions of the digital credential, or may be included in another extension.

In operation S401, the NF consumer 130 may transmit a service request to the SCP 114. In an embodiment of the disclosure, the NF consumer 130 may request a particular service for the UE 10 or a group of the UEs 10 and receive an associated response from the NF producer 140. In this case, the NF consumer 130 may not select the NF producer 140 to which the service request is to be transmitted. Instead, the NF consumer 130 may transmit, to the SCP 114, the service request including at least one of a required characteristic that may specify the NF producer 140 (as a non-limiting example, the required characteristic includes a network function type of the AMF 112, the SMF 113, the UDM 119, or the like), network slice information that may indicate a network slice from which the UE 10 or a group of the UEs 10 is able to receive services or a network slice to which the NF consumer 130 belongs, or a CCA credential that may allow authentication of the NF consumer 130.

In an embodiment of the disclosure, a CCA credential of the NF consumer 130 may include an NF instance ID of the NF consumer 130, time information that may indicate an expiration date of the credential, an NF type of an expected NF producer, information about the network slice to which the NF consumer 130 belongs, or a digital credential or URL information of the digital credential of the NF consumer 130. A CCA of an NF may be signed with a signature key of the NF.

In operation S403, in response to receiving the service request from the NF consumer 130, the SCP 114 may select the NF producer 140 that suits the required characteristic designated by the NF consumer 130. To select the NF producer 140, the SCP 114 may transmit information including the required characteristic received from the NF consumer 130 to the NRF 117 in operation S402. The SCP 114 may also receive, from the NRF 117, information of the NFs that may correspond to the NF producer 140 suitable for the required characteristic. In operation S403, the SCP 114 may select the NF producer 140 based on the received information. To select the NF producer 140, the SCP 114 may select an NF set that satisfies the required characteristic, and select the NF producer 140 that belongs to the selected NF set.

In operation S404, the SCP 114 may transmit to the NRF 117 a request to issue an access token required to transmit the service request received from the NF consumer 130 to the selected NF producer 140. In this case, the access token request message may include all or some of pieces of the following information:

NF instance ID and NF type of the NF consumer 130 information about an NF service requiring access permission information including all or at least one of NF type or NF producer instance ID of the NF producer 140 requiring access permission The SCP 114 may transmit, to the NRF 117, the request to issue the access token including a CCA credential of the NF consumer 130 in addition to the aforementioned information.

In operation S405, in response to receiving the request to issue an access token from the SCP 114, the NRF 117 may check the CCA credential information of the NF consumer 130 and information about the NF producer 140 included in the request to confirm whether the NF consumer 130 is an NF authorized to receive a service from the NF producer 140. When the NF consumer 130 is determined as an authorized NF, the NRF 117 may issue an access token that may be used in requesting a service from the NF producer 140 to the SCP 114, in operation S406.

In operation S407, after receiving the access token from the NRF 117, the SCP 114 may transmit the service request including the issued access token and the CCA credential of the NF consumer 130 to the NF producer 140.

In operation S408, in response to receiving the service request from the SCP 114, the NF producer 140 may check the access token and the CCA credential of the NF consumer 130 received along with the service request to determine whether the NF consumer 130 is a correct NF allowed to request a service from the NF producer 140 and whether the service request is allowed by the NRF 117.

After succeeding in authentication of the NF consumer 130 and verification of the access token, the NF producer 140 may construct a CCA credential of the NF producer 140, in operation S409.

After succeeding in authentication of the NF consumer 130 and verification of the access token, the NF producer 140 may transmit a service response to the SCP 114 in response to the service request, in operation S410. In this case, the service response may include information requested in the service request or response information for a service. Furthermore, the service response may include the CCA credential with which to authenticate the NF producer 140.

In an embodiment of the disclosure, the CCA credential of the NF producer 140 may include at least one of an NF instance ID of the NF producer 140, an NF instance ID of the NF consumer 130, time information indicating an expiration date of the credential, information about a network slice to which the NF producer 140 belongs, a digital credential of the NF producer 140 or URL information of the digital credential. A CCA of an NF may be signed with a signature key of the NF. The digital credential of the NF producer 140 according to an embodiment of the disclosure may include the plurality of pieces of aforementioned information included in the digital credential. For example, the digital credential associated with the CCA credential of the NF producer 140 may include at least one of an NF type of the NF producer 140 or information about an NF set to which the NF producer 140 belongs.

In operation S411, the SCP 114 may transmit a service response message received from the NF producer 140 to the NF consumer 130.

In an embodiment of the disclosure, the SCP 114 may successfully identify whether the service response message received from the NF producer 140 has been transmitted from the NF producer 140 that received the service request and transmitted from the correct NF producer 140 by verifying the CCA credential of the NF producer 140 included in the service response message and information included in the digital credential associated with the CCA credential of the NF producer 140. Furthermore, the SCP 114 may transmit the service response message to the NF consumer 130 when the procedures are successfully performed. The operation of the SCP 114 may be optionally performed. In the embodiment of the disclosure, in operation S412, the NF consumer 130 that has received the service response from the SCP 114 may perform a procedure for identifying the CCA credential of the NF producer 140 added to the service response. After the identification procedure for the CCA credential of the NF producer 130 is successfully performed, the NF consumer 130 may recognize that the service response is a correct response to the service request transmitted by the NF consumer 130 and process the service response.

In another embodiment of the disclosure, the NF consumer 130 may check at least one of information included in the CCA credential of the NF producer 140 added to the service response or information included in the digital credential associated with the CCA credential of the NF producer 140, in operation S412. For example, the NF consumer 130 may check the plurality of pieces of information included in the digital credential associated with the CCA credential of the NF producer 140 to determine whether the NF type of the NF producer 140 corresponds to the NF type of an expected NF producer included in the service request transmitted by the NF consumer 130 and authenticate whether the NF producer 140 is a correct NF. After the identification procedure for the CCA credential of the NF producer 140 and the associated digital credential is successfully performed, the NF consumer 130 may recognize that the service response is a correct response to the service request transmitted by the NF consumer 130 and process the service response.

Figure 5:
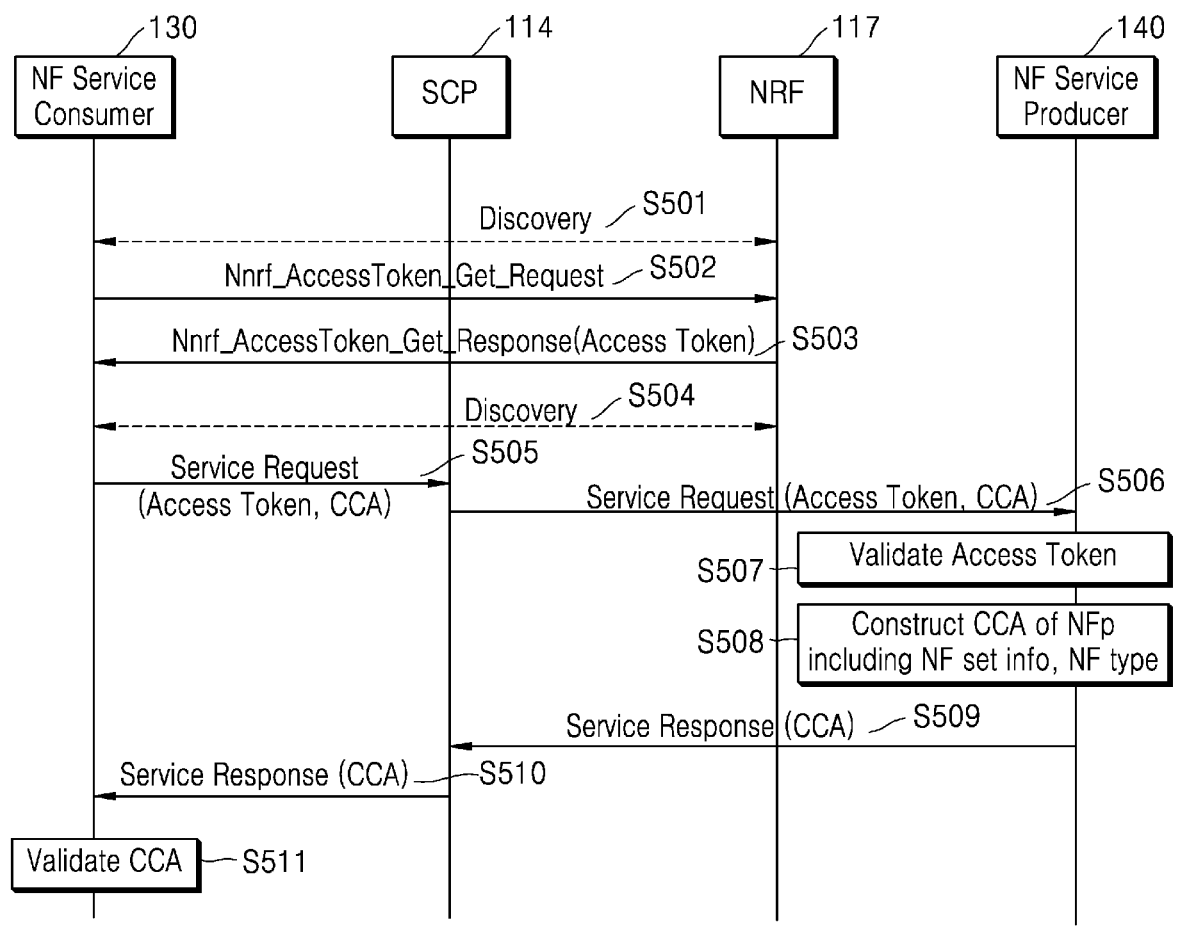
FIG. 5 illustrates an authentication and authorization procedure for service request and response of a REQUEST-RESPONSE model between network devices using network device set information for network device selection, according to an embodiment of the disclosure.

FIG. 5 is a sequence diagram of an authentication and authorization procedure for service request and response of a REQUEST-RESPONSE model between network devices using network device set information for network device selection, according to an embodiment of the disclosure.

FIG. 5 shows an embodiment of the disclosure in which the NF consumer 130 authenticates the NF producer 140 using information included in a CCA credential of the NF producer 140. In the embodiment of the disclosure of FIG. 5, the NF consumer 130 may select the NF producer 140 through data transmission and reception with the NRF 117. In the embodiment of the disclosure of FIG. 5, communication between the NF consumer 130 and the NF producer 140 may be performed via the SCP 114. In this case, when transmitting a service request including a CCA credential of the NF consumer 130, the SCP 114 may transmit the service request of the NF consumer 130 to a different NF producer from the NF producer 140 selected by the NF consumer 130. Hence, in preparation for re-selection for the NF producer 140 to be performed by the SCP 114, the NF producer 140 may add information allowing the NF consumer 130 to verify or authenticate whether the NF producer 140 is a correct one expected or targeted by the NF consumer 130 to the CCA credential of the NF producer 140 and the digital credential associated with the CCA credential. The NF consumer 130 may use the information included in the CCA credential of the NF producer 140 or the digital credential to identify whether the NF producer 140 that has transmitted a service response is the correct one expected or targeted by the NF consumer 130 and authenticate the NF producer 140.

An embodiment of the disclosure may have an effect that the NF consumer 130 authenticates the NF producer 140, even when the SCP 114 selects a different NF producer from the NF producer 140 selected by the NF consumer 130. Furthermore, the disclosure may have an effect that the NF consumer 130 authenticates the NF producer 140 based on the CCA or the digital credential of the NF producer 140, which is generated by the NF producer 140. In addition, the disclosure solves security problems that may be caused between NFs, so that the NF consumer 130 is able to safely receive services from the authenticated NF producer 140.

In an embodiment of the disclosure, the NF consumer 130 may request a particular service for the UE 10 or a group of the UEs 10 and receive an associated response from the NF producer 140. In response to receiving the service response, the NF consumer 130 may verify whether the NF that has transmitted the service response is the NF producer 140 expected by the NF consumer 130 to receive the service or an NF included in an NF set to which the NF producer 140 expected to receive the service belongs. The NF set may include two or more NFs, and different NFs may provide the same service or different services.

In operation S501, the NF consumer 130 may determine to receive a service from another NF and obtain information about the NF that may provide the service from the NRF 117.

In this case, the NRF 117 may transmit to the NF consumer 130 NF instance information corresponding to information of an NF type of the NF from which the NF consumer 130 is going to request the service and information of an NF set ID of the NF set to which the NF instance belongs.

The NF consumer 130 may store the information of the NF instance(s) and the information of the NF set received from the NRF 117 as a list of candidate NF instances and information of a target NF set, respectively. The information stored in this way may be used later to verify whether a service response message to be received comes from the correct NF producer 140.

In operation S502, the NF consumer 130 may transmit an access token request message to the NRF 117 to be authorized and given a token by the NRF 117 to transmit a service request message. In this case, the access token request message may include all or some of pieces of the following information:

NF instance ID and NF type of the NF consumer 130
information about an NF service requiring access permission
information including all or at least one of NF type or NF producer instance ID of the NF producer 140 requiring access permission The information in the access token request message may designate information about e.g., the NF producer instance ID based on the information of NF instance IDs received from the NRF 117.

The NRF 117 may determine authorization for the token request and issue a token based on the information included in the access token request message and information designated by the expected NF producer 140 (e.g., an NF type of the NF consumer 130 to receive the service). In operation S503, the access token response message including the token issued in this way may be transmitted to the NF consumer 130 from the NRF 117.

In another embodiment of the disclosure, the procedures for transmitting the access token request message and receiving the access token response message may be performed before transmission of an NF discovery request message in operation S504.

The NF consumer 130 may receive the access token response message and generate a CCA credential of the NF consumer 130.

In operation S505, the NF consumer 130 may transmit a service request message to be sent to the NF producer 140 to the SCP 114 after generating the CCA credential. The service request message may include information about a requested service, the CCA credential, and the token received from the NRF 117. In this case, the NF consumer 130 may add information about a list of candidate NF instances or an NF set to the service request message, or transmit an extra message to the SCP 114 along with the service request message. In the case that the list of candidate NF instances is transmitted in the extra message or using an extra field of the service request message, the SCP 114, when not connected to the designated NF producer 140, may select another NF instance included in the list of candidate NF instances or the NF set and transmit the service request message to the selected NF instance. That is, the SCP 114 may select the NF producer 140 based on the received service request message.

In operation S506, the SCP 114 may transmit a service request message received from the NF consumer 130 to the NF producer 140. In this case, when the SCP 114 is unable to identify the NF producer 140 designated in the service request message received from the NF consumer 130 or expects that the NF producer 140 is unable to process the service request message due to a failure in connection to the NF producer 140, the SCP 114 may discover another candidate NF producer 140 to process the service request message from the received information about the list of candidate NF instances or the target NF set, and transmit the service request message to the discovered candidate NF producer 140.

In operation S507, the NF producer 140 may verify the token and CCA credential included in the received service request message to authenticate the NF consumer 130 that has transmitted the service request message and identify whether the NF consumer 130 is an NF given access permission by the NRF 117. In the disclosure, assumed is a normal case, i.e., a case that the NF consumer 130 that has transmitted the service request message is given access permission by the NRF 117.

Subsequently, in operation S508, the NF producer 140 may generate a CCA credential of the NF producer 140.

In operation S509, the NF producer 140 may transmit a service response message to the NF consumer 130 via the SCP 114 to provide a service requested by the NF consumer 130. In this case, the NF producer 140 may add the CCA credential with which the NF consumer 130 is able to authenticate the NF producer 140 to the service response message.

In an embodiment of the disclosure, the CCA credential generated by the NF producer 140 may include at least one of an NF instance ID of the NF consumer 130, an NF instance ID of the NF producer 140, information about an NF set to which the NF producer 140 belongs, information about a network slice to which the NF producer 140 belongs, time information indicating an expiration date of the credential, or a digital credential of the NF producer 140 or URL information of the digital credential. A CCA of an NF may be signed with a signature key of the NF.

In another embodiment of the disclosure, the digital credential of the NF producer 140 may include the aforementioned information included in the digital credential as shown in FIG. 4. For example, the digital credential associated with the CCA credential of the NF producer 140 may include at least one of an NF type of the NF producer 140 or information about an NF set to which the NF producer 140 belongs.

In operation S510, the SCP 114 may transmit the service response received from the NF producer 140 to the NF consumer 130.

After receiving the service response message, the NF consumer 130 may authenticate the NF producer 140 by verifying the CCA credential of the NF producer 140 and the digital credential of the NF producer 140 in operation S511. For example, to authenticate the NF producer 140, the NF consumer 130 may verify whether the NF producer 140 belongs to the list of candidate NF instances or the target NF set managed when the NF consumer 130 transmits the service request. When the verification results indicate that the NF producer 140 belongs to the list of candidate NF instances or the target NF set transmitted in the service request message, the NF consumer 130 may authenticate whether the correct NF producer has transmitted the service response message 140.

In another embodiment of the disclosure, the CCA generated by the NF producer 140 may include information indicating the SCP 114 that has forwarded the service request received by the NF producer 140, e.g., information about an NF instance ID of the SCP 114.

In response to receiving the service response message including the CCA generated by the NF producer (CCA of NFp), the SCP 114 may consider two situations.

The first situation may be when an SCP indicated in the CCA information (i.e., the CCA generated by the NF producer 140 (CCA of NFp)) included in the service response message received by the SCP 114 corresponds to the SCP 114 (itself). In an embodiment of the disclosure, as the SCP 114 itself is indicated in the CCA information, the SCP 114 may authenticate the received service response message as a normal one.

The second situation may be when an SCP indicated in the CCA information (i.e., the CCA generated by the NF producer 140 (CCA of NFp)) included in the service response message received by the SCP 114 corresponds to other SCP than the SCP 114 (itself).

In an embodiment of the disclosure, as another SCP is indicated in the CCA information, the SCP 114 may identify the received service response message as an abnormal one.

However, the service response message may be normal even when the SCP indicated in the information of the CCA generated by the NF producer 140 (i.e., the CCA of NFp) included in the service response message received by the SCP 114 corresponds to other SCP (SCP_2) than the SCP 114 itself. In a non-limiting example, the SCP (SCP_2) requested to transmit the service request message may not directly transmit the service request message to the NF producer 140 but ask another SCP (SCP_1) to transmit the service request message. In this case, the SCP indicated in the information of the CCA generated by the NF producer 140 (CCA of NFp) included in the service response message may correspond to the SCP_2. In an embodiment of the disclosure, the SCP_1 may identify whether the SCP_1 has been requested by the SCP_2 to transmit the service request message. In a case that the SCP_1 has been requested by the SCP_2 to transmit the service request message, the SCP_1 may use additional information to identify whether the service response message received by the SCP_1 is a correct message.

In an example of the additional information based identification, when the NF consumer 130 transmits the service request message to the NF producer 140, the SCP_1 may identify (verify) whether the service response message is a correct message by verifying whether the service response message has been received as a response to be transmitted to the NF consumer 130 from the NF producer 140.

When verification according to at least one of the aforementioned verification methods has failed, the SCP 114 may reject the service response message or notify the NF consumer 130 that the service response message has not been received from the correct NF producer 140.

In an embodiment of the disclosure, when notified from the SCP 114 that the service response has not been received from the correct NF producer 140, the NF consumer 130 may determine that the service response is a wrong service response. The NF consumer 130 may then perform a series of required operations.

In the disclosure, when network devices are connected to each other through a service communication proxy, service request and associated authentication and authorization may be performed between the network devices. A service consumer in particular may select a service producer and transmit a request to the service producer through the service communication proxy.

Figure 6:
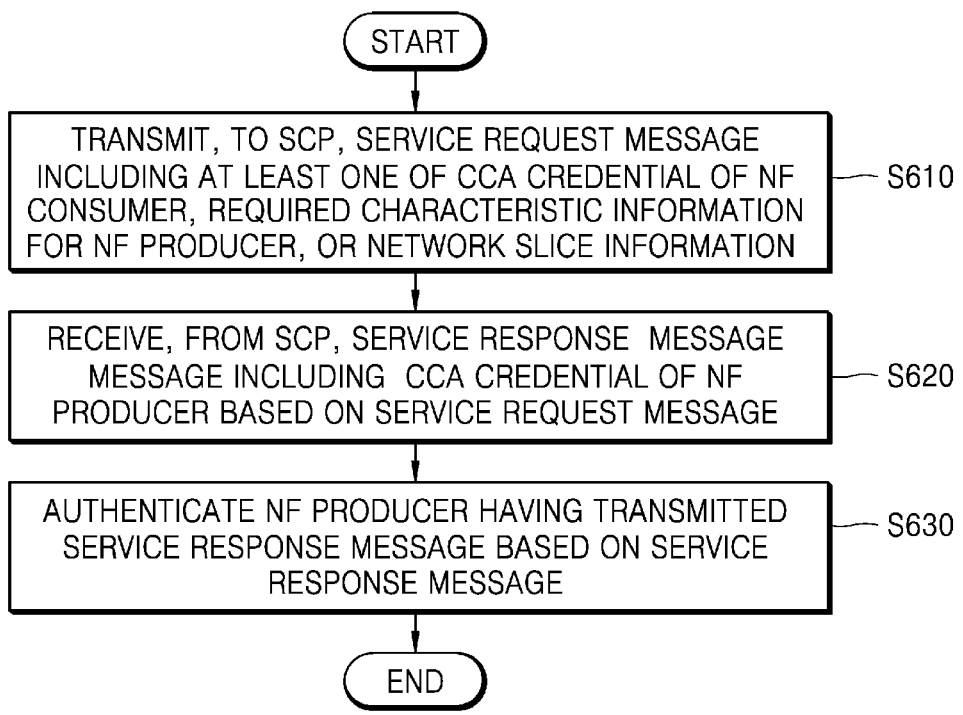
FIG. 6 illustrates a flowchart of a method by which a network function (NF) consumer operates in a wireless communication system, according to an embodiment of the disclosure.

FIG. 6 illustrates a flowchart of a method by which an NF consumer operates in a wireless communication system, according to an embodiment of the disclosure.

In an embodiment of the disclosure, the NF consumer 130 may be one of the NFs as described in FIG. 1 or network entities. The NF producer 140 may also be one of the NFs as described in FIG. 1 or network entities.

In operation S610, the NF consumer 130 may transmit a service request message including at least one of a CCA credential of the NF consumer 130, required characteristic information for the NF producer 140, or network slice information to the service communication proxy (SCP) 114.

In an embodiment of the disclosure, the required characteristic information for the NF producer 140 may include NF type information of the NF producer 140 requested by the NF consumer 130. The NF producer 140 may be selected by the SCP 114 based on the required characteristic information.

In operation S620, the NF consumer 130 may receive a service response message including a CCA credential of the NF producer 140 based on the service request message from the SCP 114.

In an embodiment of the disclosure, a digital credential of the NF consumer 130 associated with the CCA credential of the NF consumer 130 may include at least one of NF type information of the NF consumer 130, information about an NF set to which the NF consumer 130 belongs, or network slice information.

In an embodiment of the disclosure, the CCA credential of the NF producer 140 may include at least one of an NF instance ID of the NF producer 140, information about an NF set to which the NF producer 140 belongs, information about an NF type to which the NF producer 140 belongs, information about a network slice to which the NF producer 140 belongs, an NF instance ID of the NF consumer 130, expiration date information of the credential, a digital credential of the NF producer 140 or URL information of the digital credential.

In operation S630, the NF consumer 130 may authenticate the NF producer 140 that has transmitted the service response message, based on the service response message.

In an embodiment of the disclosure, the NF consumer 130 may receive, from the SCP 114, information about a result of authentication of the CCA credential of the NF producer 140 performed by the SCP 114 based on the service response message. The NF consumer 130 may identify the CCA credential of the NF producer 140 based on the information about the result of authentication of the CCA credential of the NF producer 140.

In an embodiment of the disclosure, the NF consumer 130 may authenticate the NF producer 140 based on information about the NF type to which the NF producer 140 belongs, which is included in the CCA credential of the NF producer 140, and information about the NF type of the NF producer 140 requested in the service request message.

In an embodiment of the disclosure, the NF consumer 130 may authenticate the NF producer based on information about the NF type to which the NF producer 140 belongs, which is included in a digital credential of the NF producer 140 associated with the CCA credential of the NF producer 140, and information about an NF type set to which the NF producer 140 belongs.

Figure 7:
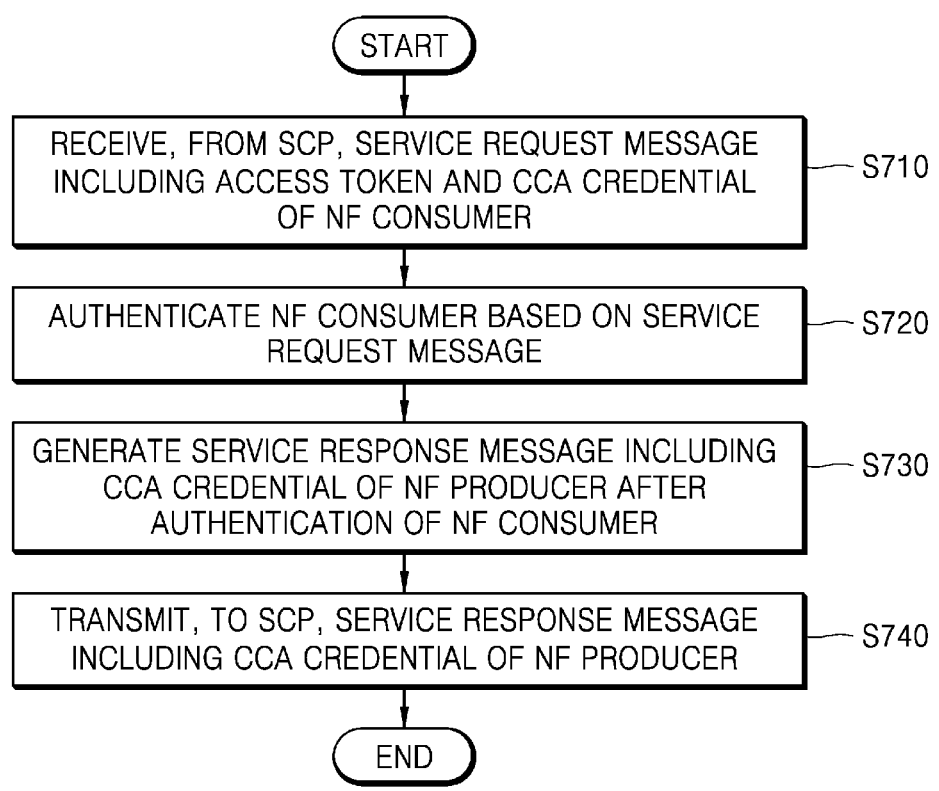
FIG. 7 illustrates a flowchart of a method by which an NF producer operates in a wireless communication system, according to an embodiment of the disclosure.

FIG. 7 illustrates a flowchart of a method by which an NF producer operates in a wireless communication system, according to an embodiment of the disclosure.

In an embodiment of the disclosure, the NF consumer 130 may be one of the NFs as described in FIG. 1 or network entities. The NF producer 140 may also be one of the NFs as described in FIG. 1 or network entities.

In operation S710, the NF producer 140 may receive a service request message including an access token and a CCA credential of the NF consumer 130 from the SCP 114.

In an embodiment of the disclosure, the NF producer 140 may be selected by the SCP 114 based on required characteristic information for the NF producer 140 included in the message transmitted by the NF consumer 130 to the SCP 114. The message transmitted by the NF consumer 130 to the SCP 114 may include at least one of a CCA credential of the NF consumer 130, required characteristic information for the NF producer 140, or network slice information. For example, the required characteristic information for the NF producer 140 may include NF type information of the NF producer 130 requested by the NF consumer 130.

In operation S720, the NF producer 140 may authenticate the NF consumer 130 based on the service request message.

In operation S730, to authenticate the NF consumer 130, the NF producer 140 may generate a service response message including a CCA credential of the NF producer 140.

In an embodiment of the disclosure, the NF producer 140 may generate the CCA credential of the NF producer 140 including at least one of an NF instance ID of the NF producer 140, information about an NF set to which the NF producer 140 belongs, information about an NF type to which the NF producer 140 belongs, information about a network slice to which the NF producer 140 belongs, an NF instance ID of the NF consumer 130, expiration date information of the credential, a digital credential of the NF producer 140 or URL information of the digital credential of the NF producer 140. In an embodiment of the disclosure, a digital credential of the NF consumer 130 associated with the CCA credential of the NF consumer 130 may include at least one of NF type information of the NF consumer 130, information about an NF set to which the NF consumer 130 belongs, or network slice information.

In operation S730, the NF producer 140 may transmit a service response message including the CCA credential of the NF producer 140 to the SCP 114.

In an embodiment of the disclosure, the digital credential of the NF producer 140 associated with the CCA credential of the NF producer 140 may include the information about the NF type to which the NF producer 140 belongs, or information about an NF type set to which the NF producer 140 belongs.

In an embodiment of the disclosure, the CCA credential of the NF producer 140 may be authenticated by the SCP 114 based on the service response message. Information about a result of authentication of the CCA credential of the NF producer 130 performed by the SCP 114 may be transmitted to the NF consumer 130.

In an embodiment of the disclosure, the NF producer 140 may be authenticated by the NF consumer 130 based on information about the NF type to which the NF producer 140 belongs, which is included in the CCA credential of the NF producer 140, and information about the NF type of the NF producer 140 requested in the service request message.

Figure 8:
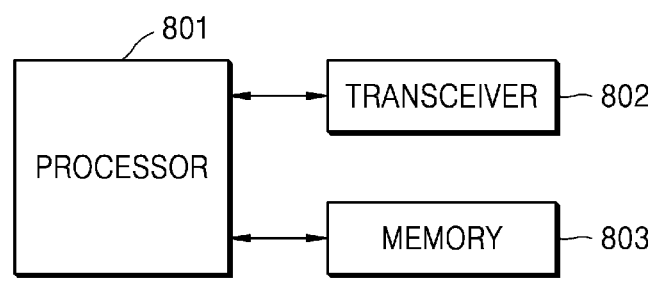
FIG. 8 illustrates a block diagram of a user equipment, according to an embodiment of the disclosure.

FIG. 8 illustrates a block diagram of a UE, according to an embodiment of the disclosure.

In an embodiment of the disclosure, a UE may include a processor 801 for controlling general operation of the UE, a transceiver 802 including a transmitter and a receiver, and a memory 803. It is, of course, not limited thereto, and the UE may include more or fewer components than those shown in FIG. 8.

In an embodiment of the disclosure, the transceiver 802 may transmit or receive a signal to or from a network entity or another UE. The signal to be transmitted to or received from the network entity may include control information and data. In addition, the transceiver 802 may receive a signal on a wireless channel and output the signal to the processor 801, and transmit a signal output from the processor 801 on a wireless channel.

In an embodiment of the disclosure, the processor 801 may control the UE to perform an operation of the aforementioned embodiments of the disclosure. The processor 801, the memory 803, and the transceiver 802 may not always implemented as separate modules but may also be integrated in a unit having the form of a single chip. The processor 801 and the transceiver 802 may be electrically connected to each other. The processor 801 may be an application processor (AP), a communication processor (CP), a circuit, an application-specific integrated circuit or at least one processor.

In an embodiment of the disclosure, the memory 803 may store a basic program for operation of the UE, an application program, data like settings information, etc. Especially, the memory 803 provides the stored data at the request of the processor 801. The memory 803 may include a storage medium such as a read only memory (ROM), a random access memory (RAM), a hard disk, a compact disc ROM (CD-ROM), and a digital versatile disk (DVD), or a combination of storage mediums. Moreover, the memory 803 may be in the plural. The processor 801 may perform the aforementioned embodiments of the disclosure based on a program stored in the memory 803 to perform the aforementioned embodiments of the disclosure.

Figure 9:
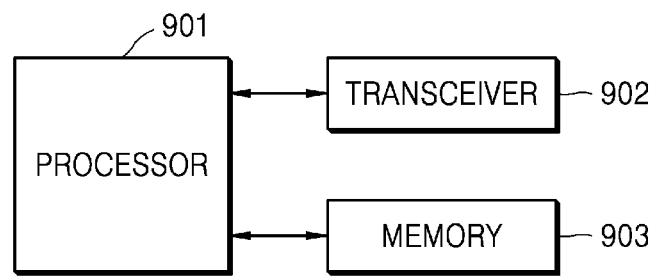
FIG. 9 illustrates a block diagram of a network entity, according to an embodiment of the disclosure.

FIG. 9 illustrates a block diagram of a network entity, according to an embodiment of the disclosure.

In an embodiment of the disclosure, the network entity may corresponds to the SCP 114, NRF 117, the NF consumer 130, or the NF producer 140. The NF consumer 130 may refer to a network function (NF) service consumer entity. The NF producer 140 may refer to an network function (NF) service producer entity. The SCP 114 may refer to a service communication proxy (SCP) entity.

In an embodiment of the disclosure, the network entity may include a processor 901 for controlling general operation of the network entity, a transceiver 902 including a transmitter and a receiver, and a memory 903. It is, of course, not limited thereto, and the network entity may include more or fewer components than those shown in FIG. 9.

In an embodiment of the disclosure, the transceiver 902 may transmit or receive a signal to or from another network entity or a UE. The signal to be transmitted to or received from the other network entity or the UE may include control information and data.

In an embodiment of the disclosure, the processor 901 may control the network entity to perform an operation of the aforementioned embodiments of the disclosure. The processor 901, the memory 903, and the transceiver 902 may not always implemented as separate modules but may also be integrated in a unit having the form of a single chip. The processor 901 and the transceiver 902 may be electrically connected to each other. The processor 901 may be an AP, a CP, a circuit, an application-specific integrated circuit or at least one processor.

In an embodiment of the disclosure, the memory 903 may store a basic program for operation of the network entity, an application program, data like settings information, etc. Especially, the memory 903 provides the stored data at the request of the processor 901. The memory 903 may include a storage medium such as a ROM, a RAM, a hard disk, a CD-ROM, and a DVD, or a combination of storage mediums. Moreover, the memory 903 may be in the plural. The processor 901 may perform the aforementioned embodiments of the disclosure based on a program stored in the memory 903 to perform the aforementioned embodiments of the disclosure.

It should be noted that the aforementioned block diagrams, illustrations of control/data signal transmission methods, and illustrations of operation procedures are not intended to limit the scope of the disclosure. In this respect, all the components, entities, or operations as described in the embodiments of the disclosure should not be interpreted as essential elements to implement the disclosure, and merely some of them may be used to implement the disclosure within the scope of the disclosure. Furthermore, the embodiments of the disclosure may be operated in combination if necessary. For example, parts of the methods proposed in the disclosure may be combined to operate the network entity and the UE.

The aforementioned operations of the base station or the UE may be implemented by program codes stored in a storage equipped in the base station or the UE. In other words, the controller of the base station or the UE may perform the aforementioned operations by reading out and executing the program codes with a processor or a central processing unit (CPU).

Various components and modules of the entity, base station or UE may be implemented in hardware such as complementary metal oxide semiconductor (CMOS)-based logic circuits, firmware, software embedded in a machine-readable medium, and/or a combination thereof. For example, various electrical structures and methods may be practiced using electrical circuits such as transistors, logic gates, and application specific integrated circuits (ASICs).

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a compact disc-ROM (CD-ROM), a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a CD-ROM), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily generated in a storage medium that may be readable to a device such as a server of the manufacturer, a server of the application store, or a relay server.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents. Thus, it will be apparent to those ordinary skilled in the art that the disclosure is not limited to the embodiments of the disclosure described, which have been provided only for illustrative purposes. Furthermore, the embodiments may be operated by being combined with one another if necessary. For example, parts of the methods proposed in the disclosure may be combined to operate the BS and the terminal. Although the embodiments of the disclosure are proposed based on 5G or NR systems, modifications to the embodiments of the disclosure, which do not deviate from the scope of the disclosure, may be applicable to other systems such as an LTE system, an LTE-A system, an LTE-A-Pro system, etc.

Several embodiments of the disclosure have thus been described, but it will be understood that various modifications can be made without departing the scope of the disclosure. Thus, it will be apparent to those of ordinary skill in the art that the disclosure is not limited to the embodiments described, but can encompass not only the appended claims but the equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network function (NF) service consumer entity in a wireless communication system, the method comprising:
    transmitting, to a service communication proxy (SCP) entity, a service request message including at least one of a client credentials assertion (CCA) credential of the NF service consumer entity, or information related to an NF service producer entity;
    receiving, from the SCP entity, a service response message including a CCA credential of the NF service producer entity based on the service request message, wherein the service response message generated by the NF service producer entity is forwarded by the SCP entity to the NF service consumer entity; and
    authenticating the NF service producer entity based on the service response message.

2. The method of claim 1, wherein the information related to the NF service producer entity includes NF type information of the NF service producer entity requested by the NF service consumer entity.

3. The method of claim 1,
    wherein the CCA credential of the NF service producer entity is secured with a signature of the NF service producer entity.

4. The method of claim 1, wherein the CCA credential of the NF service producer entity comprises at least one of an NF instance identity (ID) of the NF service producer entity, NF set information of the NF service producer entity, NF type information of the NF service producer entity, information about a network slice to which the NF service producer entity belongs, an NF instance ID of the NF service consumer entity, expiration time information of the CCA credential, a digital credential of the NF service producer entity, or universal resource locator (URL) information of the digital credential of the NF service producer entity.

5. The method of claim 1, wherein the authenticating of the NF service producer entity comprises:
    authenticating the NF service producer entity based on NF type information of the NF service producer entity included in the CCA credential of the NF producer and information about an NF type of the NF service producer entity requested in the service request message.

6. The method of claim 1, wherein a digital credential of the NF service consumer entity associated with the CCA credential of the NF service consumer entity comprises at least one of NF type information of the NF service consumer entity, information about an NF set to which the NF service consumer entity belongs, or network slice information.

7. The method of claim 1, wherein the authenticating of the NF service producer entity comprises:
    authenticating the NF service producer entity based on at least one of NF type information of the NF service producer entity or NF type set information of the NF service producer entity, included in a digital credential of the NF service producer entity associated with the CCA credential of the NF service producer entity.

8. A method performed by a network function (NF) service producer entity in a wireless communication system, the method comprising:
    receiving, from a service communication proxy (SCP) entity, a service request message including an access token and a client credentials assertion (CCA) credential of an NF service consumer entity;
    authenticating the NF service consumer entity based on the service request message;
    generating a service response message including a CCA credential of the NF service producer entity in case that the NF service consumer entity is authenticated; and
    transmitting, to the SCP entity, the service response message including the CCA credential of the NF service producer entity.

9. The method of claim 8, wherein the service request message is received based on a message transmitted by the NF service consumer entity to the SCP entity, wherein the message transmitted by the NF service consumer entity to the SCP entity includes at least one of the CCA credential of the NF service consumer entity, or the information related to the NF service producer entity, and wherein the information related to the NF service producer entity includes NF type information of the NF service producer entity requested by the NF service consumer entity.

10. The method of claim 8, wherein the CCA credential of the NF service producer entity is secured with a signature of the NF service producer entity.

11. The method of claim 8, wherein the generating of the service response message including the CCA credential of the NF service producer entity comprises:
    generating the CCA credential of the NF service producer entity including at least one of an NF instance identity (ID) of the NF service producer entity, NF set information of the NF service producer entity, NF type information of the NF service producer entity, information about a network slice to which the NF service producer entity belongs, an NF instance ID of the NF service consumer entity, expiration time information of the CCA credential, a digital credential of the NF service producer entity, or universal resource locator (URL) information of the digital credential of the NF service producer entity.

12. The method of claim 8, wherein the NF service producer entity is authenticated based on NF type information of the NF service producer entity included in the CCA credential of the NF service producer entity and information about an NF type of the NF service producer entity requested in the service request message.

13. The method of claim 8, wherein a digital credential of the NF service consumer entity associated with the CCA credential of the NF service consumer entity comprises at least one of NF type information of the NF service consumer entity, information about an NF set to which the NF service consumer entity belongs, or network slice information.

14. The method of claim 8, wherein a digital credential of the NF service producer entity associated with the CCA credential of the NF service producer entity comprises at least one of NF type information of the NF service producer entity or NF type set information of the NF service producer entity.

15. A network function (NF) service consumer entity operating in a wireless communication system, the NF service consumer entity comprising:
 a transceiver; and
 at least one processor, wherein the at least one processor is configured to transmit, to a service communication proxy (SCP) entity, a service request message including at least one of a client credentials assertion (CCA) credential of the NF service consumer entity, or information related to an NF service producer entity, receive, from the SCP entity, a service response message including a CCA credential of the NF service producer entity based on the service request message, wherein the service response message generated by the NF service producer entity is forwarded by the SCP entity to the NF service consumer entity, and authenticate the NF service producer entity based on the service response message.

16. The NF service consumer entity of claim 15, wherein the information related to the NF service producer entity includes NF type information of the NF service producer entity requested by the NF service consumer entity.

17. The NF service consumer entity of claim 15, wherein the CCA credential of the NF service producer entity is secured with a signature of the NF service producer entity.

18. The NF service consumer entity of claim 15, wherein the CCA credential of the NF service producer entity comprises at least one of an NF instance identity (ID) of the NF service producer entity, NF set information of the NF service producer entity, NF type information of the NF service producer entity, information about a network slice to which the NF service producer entity belongs, an NF instance ID of the NF service consumer entity, expiration time information of the CCA credential, a digital credential of the NF service producer entity, or universal resource locator (URL) information of the digital credential of the NF service producer entity.

19. The NF service consumer entity of claim 15, wherein the at least one processor is further configured to:
 authenticate the NF service producer entity based on NF type information of the NF service producer entity included in the CCA credential of the NF producer and information about an NF type of the NF service producer entity requested in the service request message.

20. The NF service consumer entity of claim 15, wherein the at least one processor is further configured to:
 authenticate the NF service producer entity based on at least one of NF type information of the NF service producer entity or NF type set information of the NF service producer entity, included in a digital credential of the NF service producer entity associated with the CCA credential of the NF service producer entity.

* * * * *